(12) United States Patent
Avetisyan (10) Patent No.: US 6,629,396 B1
(45) Date of Patent: Oct. 7, 2003

(54) CELL ADAPTABLE FOR CONSTRUCTION OF A HOUSING STRUCTURE

(76) Inventor: Gevorg Avetisyan, 1100 Leland Way, Burbank, CA (US) 91504

( * ) Notice: Subject to any disclaimer, the term of this patent is extended or adjusted under 35 U.S.C. 154(b) by 0 days.

(21) Appl. No.: 09/863,711

(22) Filed: May 22, 2001

Related U.S. Application Data (60) Provisional application No. 60/206,199, filed on May 22, 2000.

(51) Int. Cl.⁷ .................................................. E04C 2/54
(52) U.S. Cl. ...................... 52/783.1; 52/220.8; 52/270; 52/406.1; 52/406.3; 52/788.1; 52/793.11; 52/790.1; 219/19; 219/209; 219/212; 219/213; 219/528; 219/529; 219/541; 219/537; 219/549; 219/550
(58) Field of Search .................... 52/220.8, 270, 52/406.1, 406.3, 783.1, 788.1, 793.11, 790.1, 19; 219/209, 213, 212, 528, 529, 541, 549, 537, 550

(56) References Cited

U.S. PATENT DOCUMENTS

| | | | | |
|---|---|---|---|---|
| 2,479,268 A | * | 8/1949 | Sarria ........................... 392/339 |
| 2,612,585 A | * | 9/1952 | McCann ....................... 219/19 |
| 2,617,011 A | * | 11/1952 | MacKendrick ............... 219/46 |
| 2,889,439 A | * | 6/1959 | Musgrave ...................... 219/1 |
| 3,017,493 A | * | 1/1962 | Cooke .......................... 219/537 |
| 3,095,491 A | * | 6/1963 | Deacon ........................ 219/19 |
| 3,119,918 A | * | 1/1964 | Simon .......................... 219/19 |
| 3,143,641 A | * | 8/1964 | Wise ............................ 219/549 |
| 3,202,801 A | * | 8/1965 | Saluri ........................... 219/528 |
| 3,303,324 A | * | 2/1967 | Appleman ..................... 219/345 |
| 3,445,628 A | * | 5/1969 | Bateman ....................... 219/345 |
| 3,564,207 A | * | 2/1971 | Joeckel ......................... 219/213 |
| 3,657,516 A | * | 4/1972 | Fujihara ....................... 219/213 |
| 3,766,644 A | * | 10/1973 | Davis ........................... 219/213 |
| 3,780,262 A | * | 12/1973 | Rudd ........................... 392/339 |
| 3,812,320 A | * | 5/1974 | Borgren ....................... 219/213 |
| 4,035,606 A | * | 7/1977 | Browder ...................... 219/211 |
| 4,247,756 A | * | 1/1981 | Cucinotta et al. ........... 219/528 |
| 4,415,798 A | * | 11/1983 | Knappe ....................... 219/213 |
| 4,561,441 A | * | 12/1985 | Kolodziej .................... 607/114 |
| 4,574,186 A | * | 3/1986 | Sakai et al. .................. 219/528 |
| 4,620,085 A | * | 10/1986 | Horikawa et al. ............ 174/51 |
| 4,661,689 A | * | 4/1987 | Harrison ...................... 219/528 |

(List continued on next page.)

Primary Examiner—Carl D. Friedman
Assistant Examiner—Christy M. Green
(74) Attorney, Agent, or Firm—Frank L. Zugelter (57) ABSTRACT

A manufacture or cell (20) formed by a closed case (21) of fabric material (23) in which a multiple number of meltable plastic pellets (24) are disposed and with which an electrical line (25), here in the form of lines (25-1, 25-2), combine in an interwoven assembly. Heat is applied to the pellets (24) via the electrical line (25) to melt them into a mass of substance that solidifies into a solid wall or thickness while concurrently adhering to the fabric material (23) so that the resulting structure is in a cast condition, transformed from its flexible state prior to application of the heat to pellets (24) into a wall-like member. The cell (20) is useful in application of constructing a habitable temporary living housing or shelter for victims arising out of a catastrophe.

12 Claims, 9 Drawing Sheets

U.S. PATENT DOCUMENTS

| | | | | |
|---|---|---|---|---|
| 4,725,717 A | * | 2/1988 | Harrison | 219/528 |
| 4,817,704 A | * | 4/1989 | Yamashita | 165/10 |
| 4,916,290 A | * | 4/1990 | Hawkins | 219/385 |
| 4,967,057 A | * | 10/1990 | Bayless et al. | 219/213 |
| 5,035,241 A | * | 7/1991 | Walasek et al. | 607/114 |
| 5,150,707 A | * | 9/1992 | Anderson | 607/114 |
| 5,151,578 A | * | 9/1992 | Phillips | 219/549 |
| 5,336,255 A | * | 8/1994 | Kanare et al. | 607/149 |
| 5,371,340 A | * | 12/1994 | Stanfield | 119/28.5 |
| 5,405,671 A | * | 4/1995 | Kamin et al. | 428/69 |
| 5,436,429 A | * | 7/1995 | Cline | 219/202 |
| 5,461,213 A | * | 10/1995 | Rodin | 219/213 |
| 5,674,423 A | * | 10/1997 | Wright, Sr. | 219/217 |
| 5,871,527 A | * | 2/1999 | Gubernick | 126/204 |
| 5,892,202 A | * | 4/1999 | Baldwin et al. | 219/387 |
| 5,932,129 A | * | 8/1999 | Hyatt | 219/528 |
| 5,999,699 A | * | 12/1999 | Hyatt | 392/339 |
| 6,087,630 A | * | 7/2000 | Miller et al. | 219/213 |
| 6,294,768 B1 | * | 9/2001 | Liebich | 119/526 |
| 6,300,599 B1 | * | 10/2001 | Owens et al. | 219/387 |

* cited by examiner

CELL ADAPTABLE FOR CONSTRUCTION OF A HOUSING STRUCTURE

This invention is related to Provisional Application, Ser. No. 60/206,199, filed May 22, 2000.

TECHNICAL FIELD

This invention is directed to a cell for utilization in a temporary housing shelter to be formed by cells as panels or by panels of cells, and by which flexibility in the design of the housing constructed by an assembly of panels with this invention's cells can be achieved. The cells can be cast in their utilization phase that includes variously designed geometrical configurations for inclusion in the temporary housing shelter.

BACKGROUND TO THE INVENTION

In investigating compact spaces for living by victims of natural and man-made catastrophes and which can create a habitable and comfortable environment satisfying basic common needs in such circumstances, until the usual habitat for the victims are again realized, temporary living units were generated in the past. With the understanding of how these compact spaces can be utilized for building temporary living units, development of a collection of habitable controlled areas began to be developed. Collectively speaking, these areas have become programmatic over time in terms of producing temporary housing accommodations. With this invention, an improved and better temporary communal living unit can be produced, with panels formed from the cells, or the cells functioning as building panels, of this invention, and which units will aid in the recovery process of human beings who are victims of catastrophes.

SUMMARY OF THE INVENTION

The invention is directed towards a cell manufacture a multiple number of them forming a panel which in turn can be connected to other panels formed from like cells for deployment as a temporary housing or shelter. Each cell is formed from fabricated material containing a pocket, with an arrangement or assembly of plastic pellets disposed within the pocket and one or more arrangements of electrical wiring in combination with the plastic pellets. In this condition for the cell, it is flexible in terms of being able to be geometrically fashioned into a particular firm or rigid design upon its utilization in the construction of the temporary housing or shelter formed by a plurality of panels each made up of a multiple number of cells. Electrical energy is supplied to the electrical wiring which projects through multiple numbers of spaced pellets within the cell and which by their nature melt upon heat being applied to them. The heat generated by such electrical energy melts the pellets, fusing them together to form a continuous mass of substance, along with adherence to the cell's casing material as the substance cures. A firm or rigid cell results in a geometrical configuration which can be fashioned prior to the application of the heat to the cell. Thus, by connecting together a multiple number of panels formed by one or more cells in a geometrical three-dimensional configuration, a temporary living housing or shelter can be fashioned. Thus, the flexibility of the cell in its manufactured state provides for a desired three-dimensional consideration before erecting the temporary housing or shelter.

An object of this invention is to provide a novel manufacture for use in building or constructing a shelter or housing.

An object of this invention is to provide a manufacture that can be utilized in a timely manner towards sheltering victims of catastrophes.

Another object of this invention is to provide for the production of temporary living units for victims of natural catastrophes by the utilization of this invention.

A further object of the invention is to provide a construction manufacture or cell that is environmentally friendly.

A still further object of the invention is to provide private, compact, and comfortable housing satisfactory to humans in an emergency or other situation.

Yet another object of this invention is to provide a construction cell that can be used to design a housing for temporary individual interior spaces for different living applications, with comfort and compactness in mind.

Still another object of this invention is to provide for a flexible cell adaptable for application to an injured body limb as a cast upon the transformation of its flexible state to a cast state thereby holding firm the body limb until it heals.

These and other objects and advantages will become more fully apparent by a complete and full reading of the following description, its appended claims, and the accompanying drawing comprising seven (7) sheets of ten (10) FIGURES.

BEST MODE FOR CARRYING OUT THE INVENTION

Figures 1, 1A:
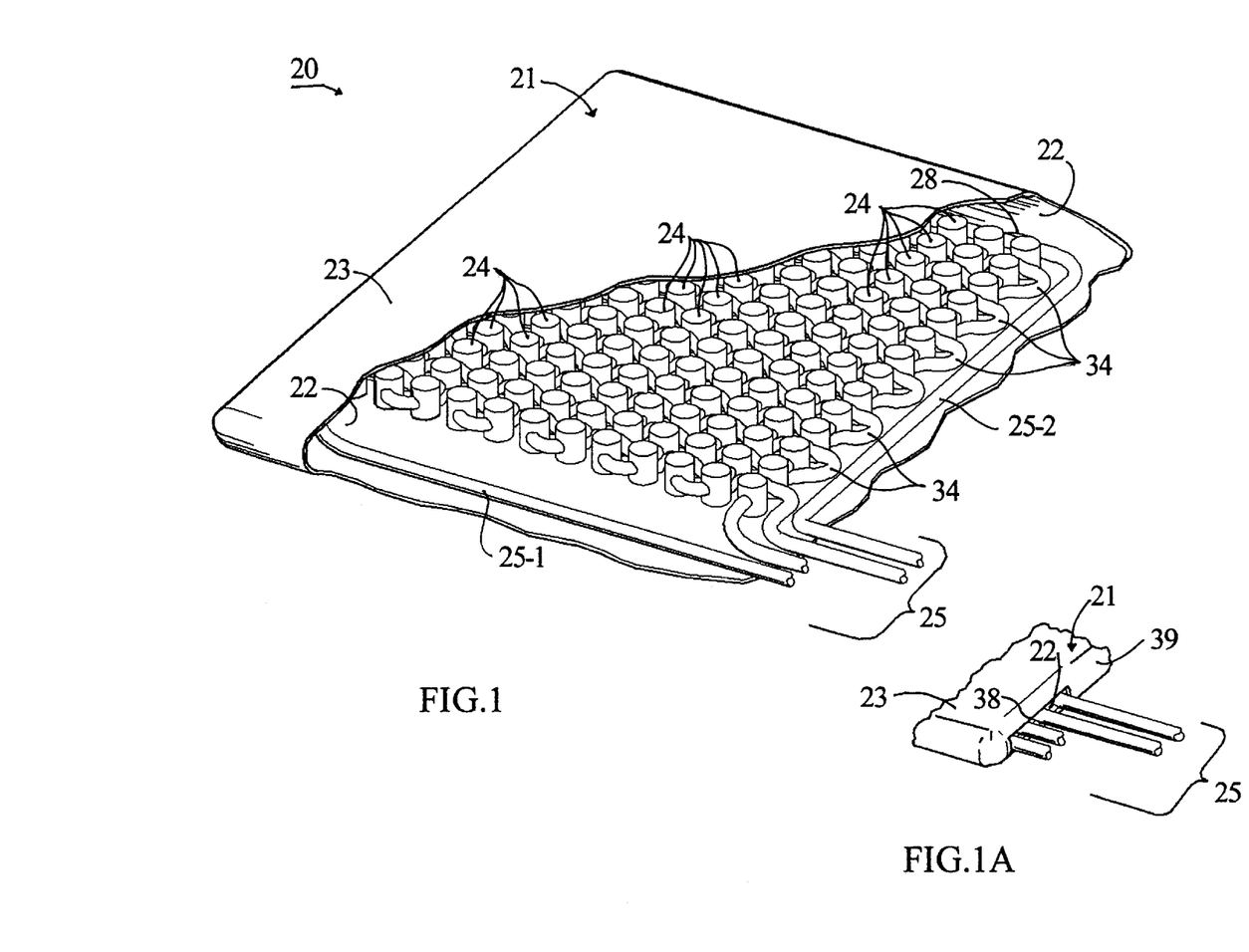
FIG. 1 is a perspective view, partially broken away, of the cell of this invention.
FIG. 1A is a fragmentary perspective view of an opening in the cell for ingress and egress of electrical wiring components included in the cell.

Referring now to the drawing in which reference characters refer to like numerals hereinafter, FIG. 1 illustrates a cell 20 the subject matter of this invention. Cell 20 is formed by a case 21 forming a pocket or enclosure 22 by material 23 made of at least a pair of sheets or layers which fasten together about their edges, together with a plurality of meltable pellets 24 and one or more electrical lines 25, FIGS. 1, 1B, 1C, contained within case 21. Material 23 of case 21 is of a material such as fabric, an example of which being a blanket-or-tent-covering-like fabric, and to which adherence of pellets 24 situated within case 21, after they are caused to melt and set, is obtained for subsequent utilization of cell 20. Pellets 24 are formed preferably in a cylinder-like cut, of a solid state, but when heated melt, fusing together within pocket 22, not only generating a solid thickness or wall, but also in the physical process adhering to the material of case 21, forming a rigid or firm manufacture. Pellets 24 are spaced one from another within case 21, FIG. 1B, so as to provide for a weave of electrical line(s) 25 combined with them, more fully described hereinafter.

Figure 1B:
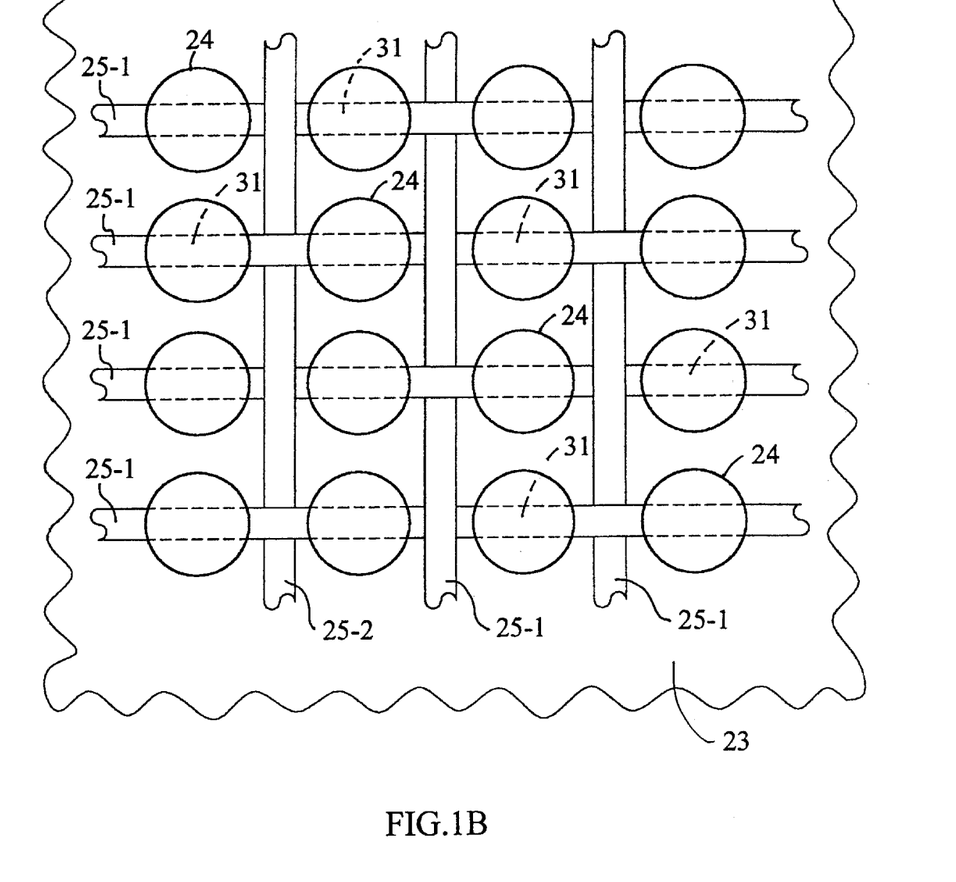
FIG. 1B is an enlarged fragmentary diagrammatic plan view, with the top layer of the cell's case removed, illustrating the inter-relationship of the electrical wiring with the pellets of the cell of FIG. 1.
Figure 2:
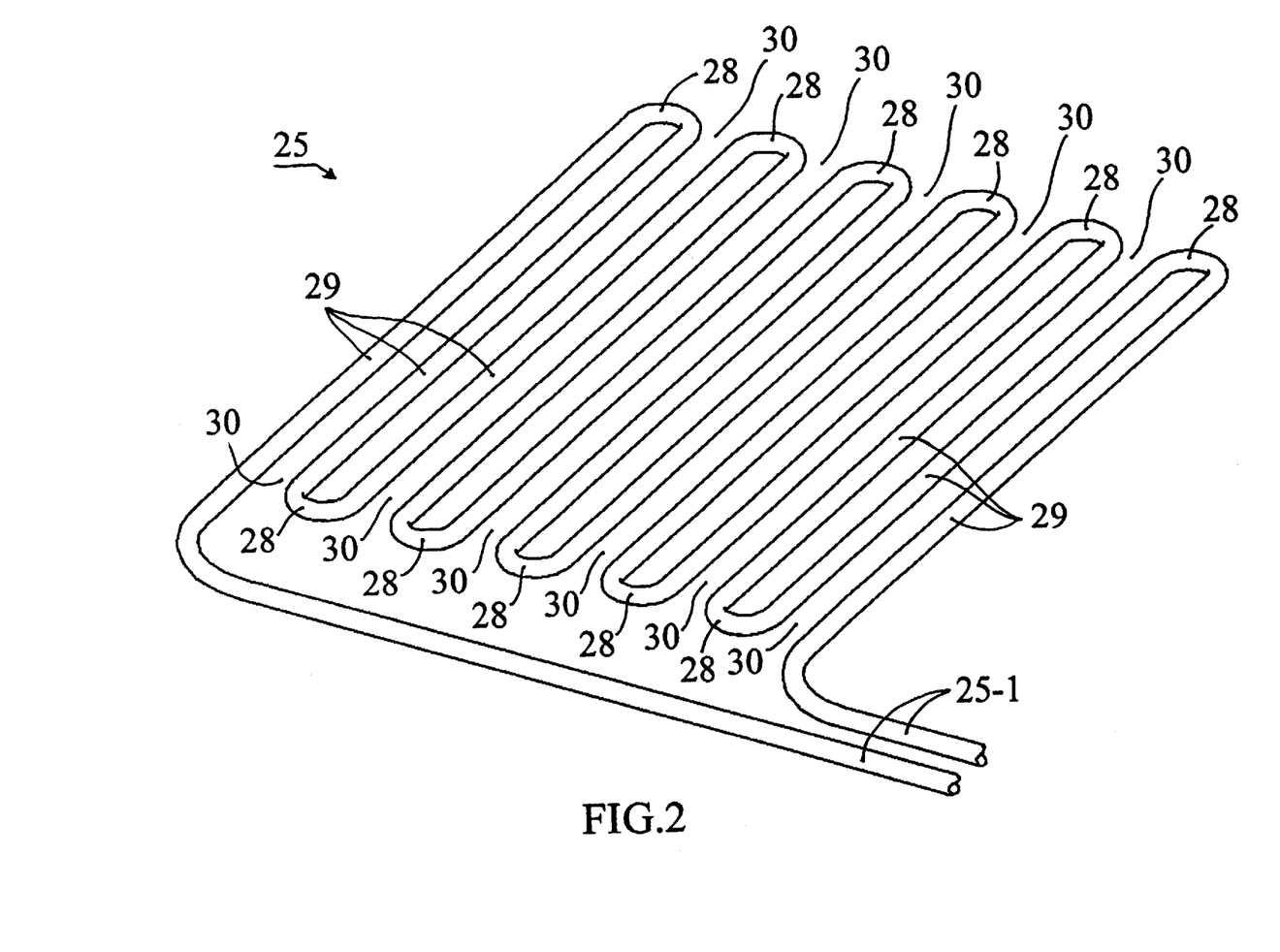
FIG. 2 is a perspective view of a weave of an electrical wiring utilized in the cell of FIG. 1.
Figure 4:
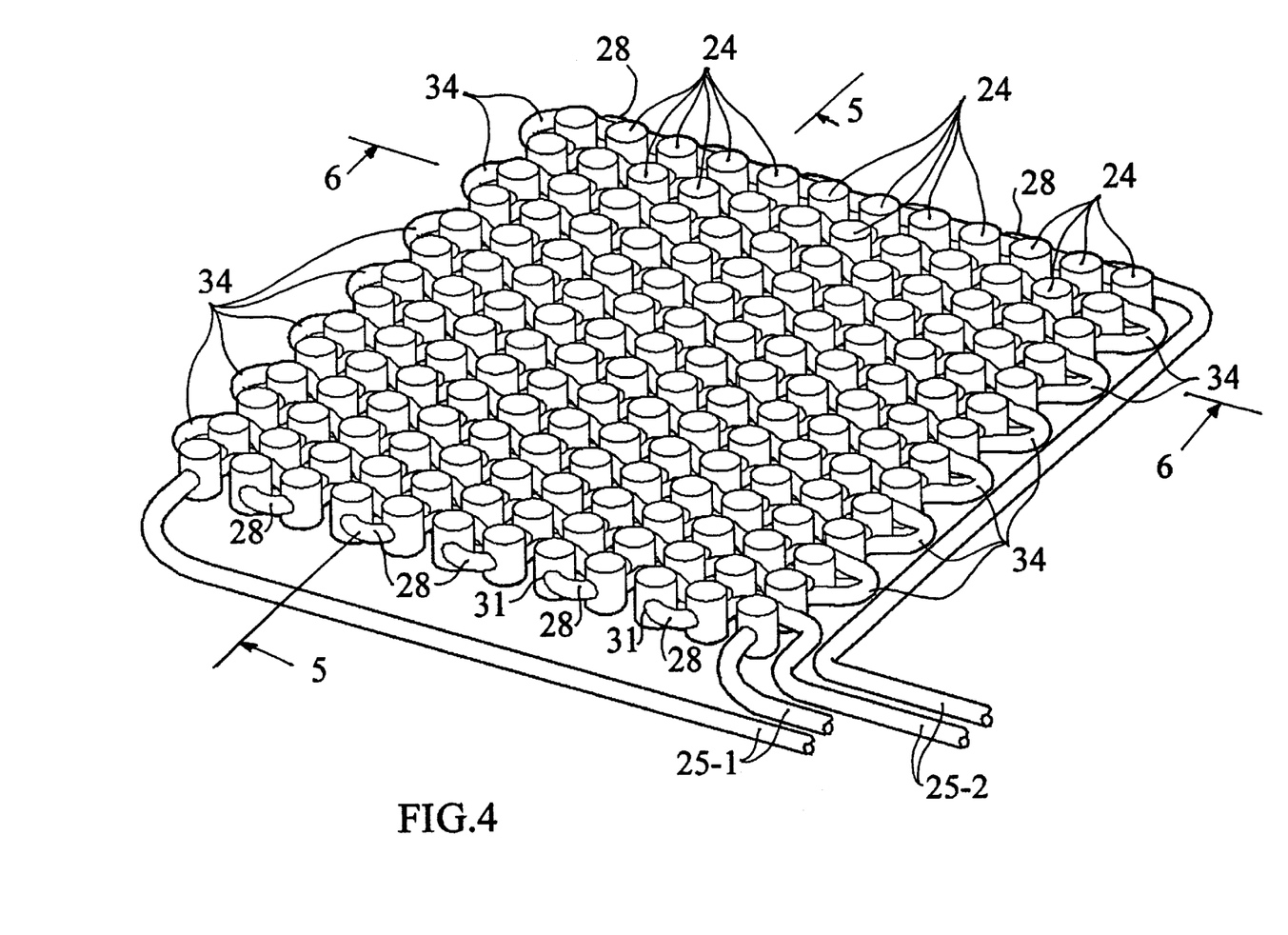
FIG. 4 is a perspective view of an assembly of the weaves of the electrical wiring illustrated in FIGS. 3 and 4, combined or joined together with pellets that are utilized in the cell of FIG. 1.
Figure 5:
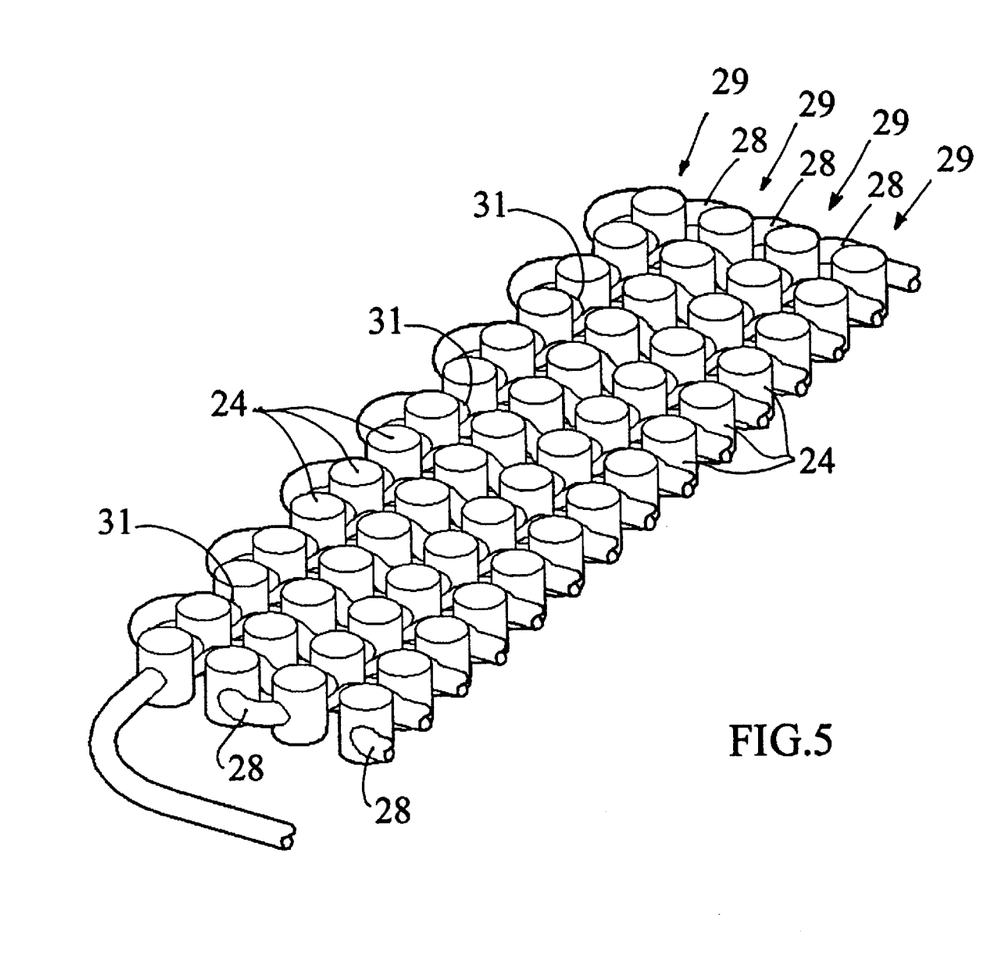
FIG. 5 is a fragmentary perspective view of FIG. 4 taken through line 5—5 of FIG. 4.

An electrical line 25-1, FIG. 2, encased in a tubular plastic insulation, for threading through each pellet 24, is looped as at 28, FIGS. 2, 4, at both ends of its weave to form segments 29 at a spaced intervals 30 from one to the next as its weave displaces across the extant of case 21 in one planar direction. Each segment 29 lies or displaces in line with its row of spaced pellets 24 so that each segment 29 of line 25-1 threads through a hole 31, FIG. 1B, 4, 5, formed in each pellet 24.

Figure 3:
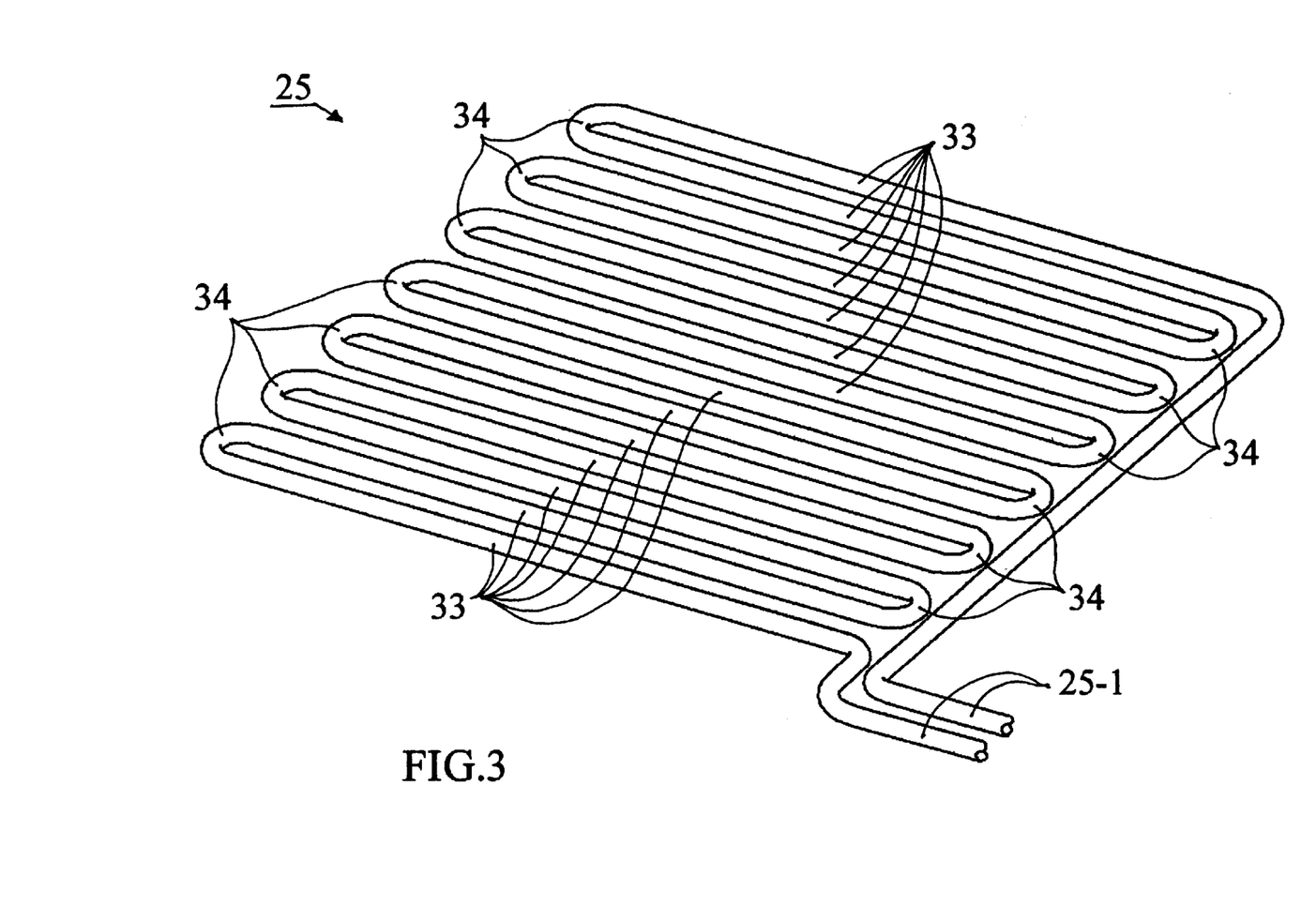
FIG. 3 is a perspective view of another weave of another electrical wiring utilized in the cell of FIG. 1.
Figure 6:
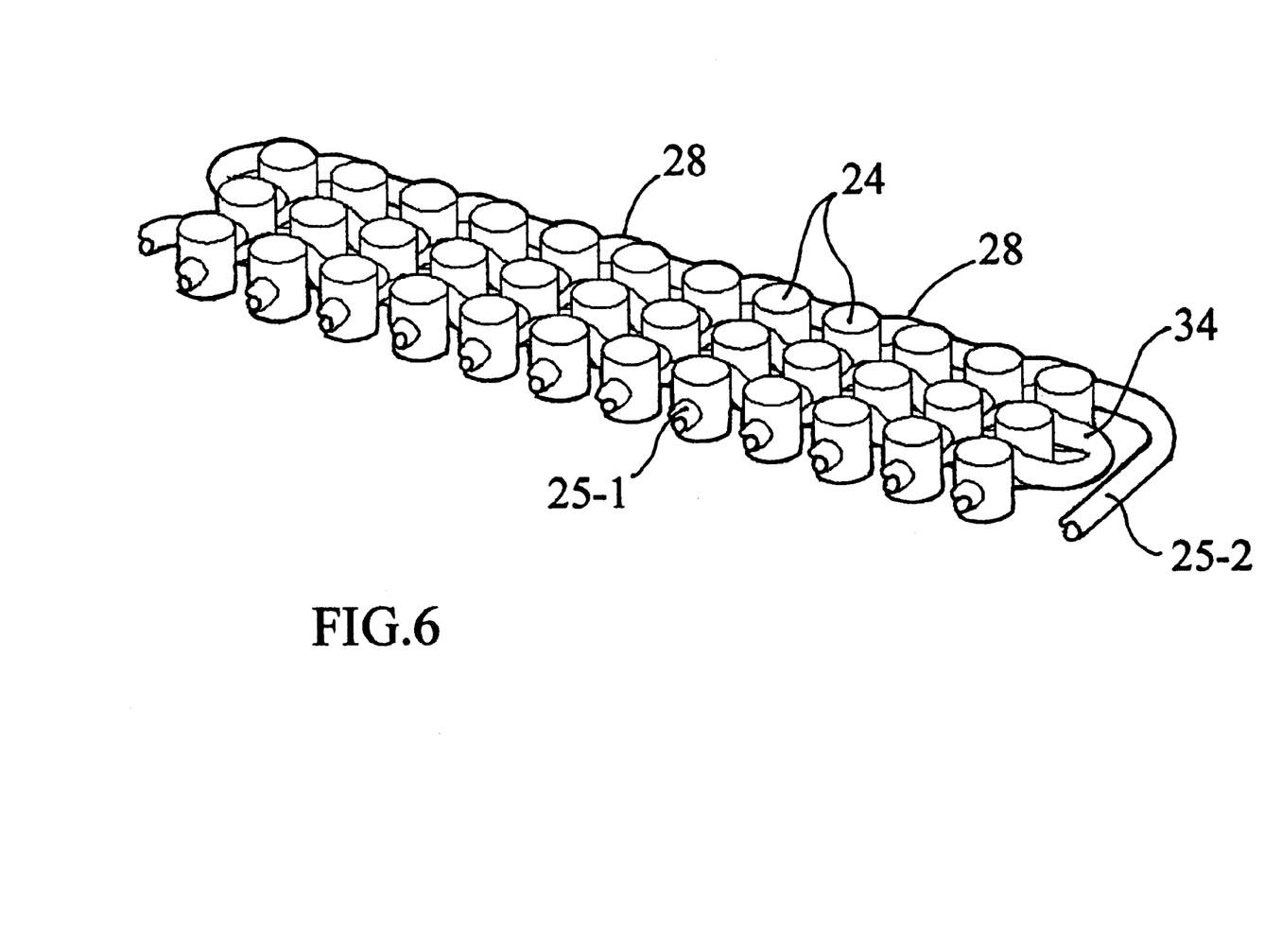
FIG. 6 is a fragmentary perspective view of FIG. 4 taken through line 6—6 of FIG. 4.

A weave of another electrical line 25-2, FIG. 3, displaces across the extant of case 21 in its planar direction by which its spaced segments 33, FIGS. 3, 1B, formed in its weave in cell 20, crosses or interweaves with corresponding segments 29 of electrical line 25-1, FIG. 1B. Each electrical line 25-2, FIGS. 3, 4, 6, is looped as at 34, at both ends of each of its segments 33, as the electrical line 25-2 displaces to its next segment 33.

Figure 1C:
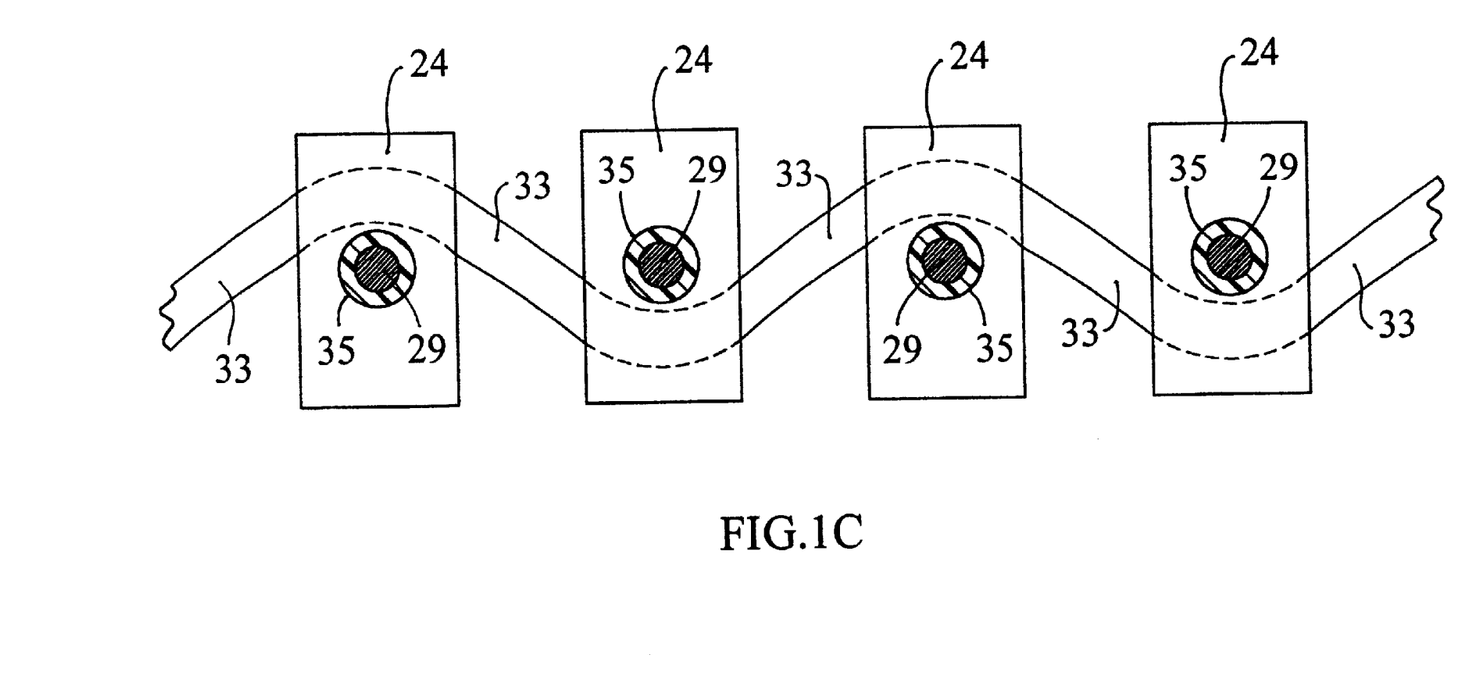
FIG. 1C is an enlarged fragmentary diagrammatic view taken on line 1C—1C of FIG. 1B.

FIG. 1C illustrates the manner by which the segments 33 in electrical line 25-2 interweave with their corresponding segments 29 of electrical line 25-1. Each segment 33 of electrical line 25-2 crosses over a corresponding segment 29 of electrical line 25-1 and then crosses under the next corresponding segment 29 of electrical line 25-1, and so forth throughout the length within the extant of case 21 of each segment 33 until it reaches its length at which a loop 34 is required. FIG. 1C also illustrates a plastic insulation 35 that encases segment 29 of electrical line 25-1, and it should be understood that such insulation is used as well on other electrical wiring in this disclosure.

The aforesaid described assembly of pellets and electrical lines are encased within material 23 of case 21 to the extant generally in all directions of pocket 22 formed by case 21, the case 21 being completely closed except for the egress. FIG. 1A, of electrical lines 25 through a suitable opening 38 formed in one edge or side wall 39 of case 21.

Figure 7:
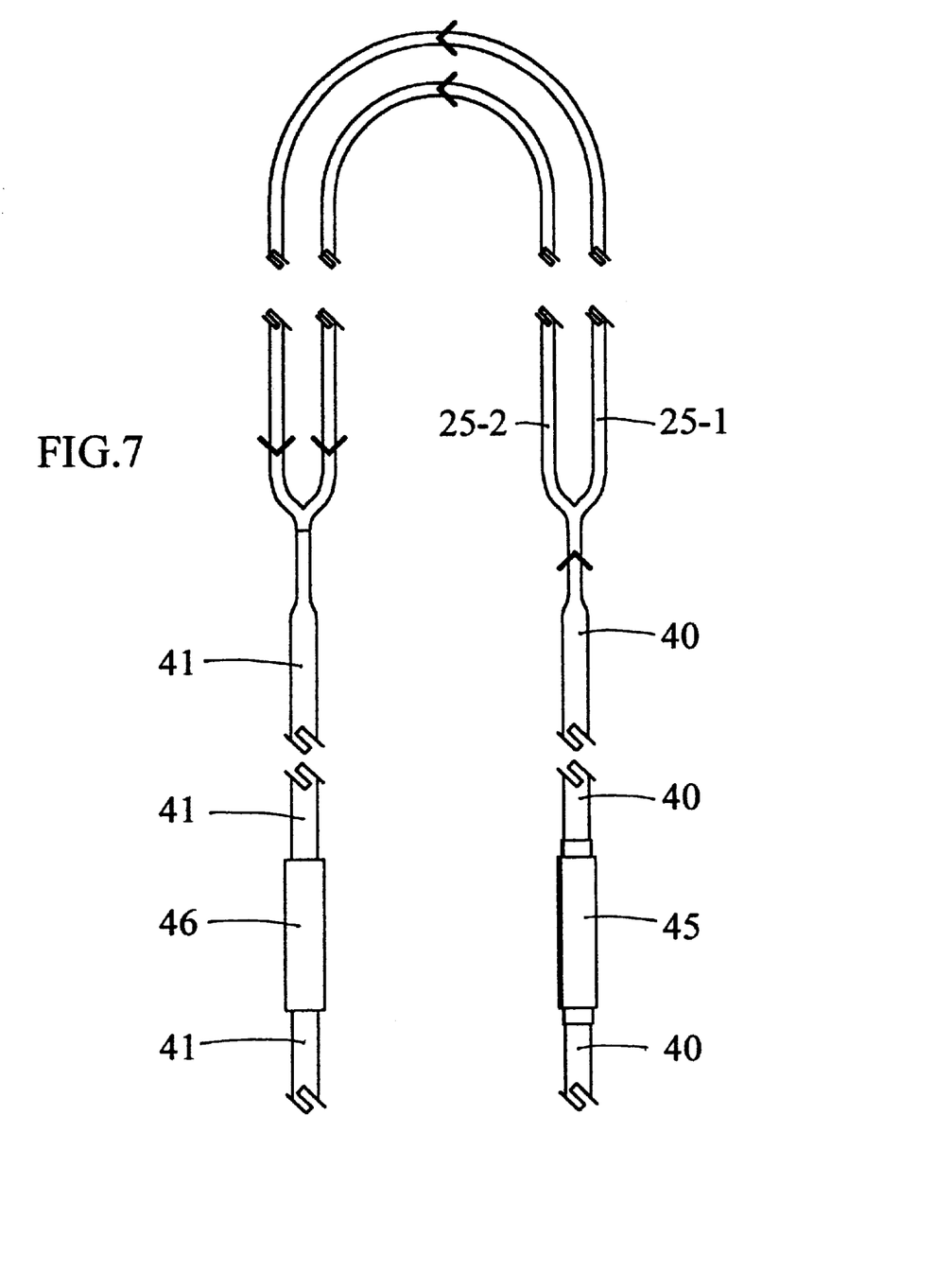
FIG. 7 is a diagrammatic view of the electrical wiring of FIGS. 2 and 3.

FIG. 7 illustrates diagrammatically the introduction of electrical energy into cell 20 and into the electrical lines 25 of cell 20. A positive main electrical line 40 (carrying positive leads) provides electrical energy to the electrical lines 25-1 and 25-2 in cell 20. Line 40 is divided into the positive electrical line 25-1 for cell 20 and the positive line 25-2 for cell 20. As illustrated in FIG. 1A, each electrical line 25-1, 25-2 ingresses into pocket 22 and egresses from pocket 22 of case 21. The electrical lines 25 egress from case 21 to unite in a negative electrical line 41 and by which an operational circuitry is achieved. A fuse 45 included in line 40 determines the duration of electrical energy to cell 20, which is timed with the adherence of melting pellets 24 to case 21. A coil diode 46 is included in electrical line 41 to control or reduce the amount of charge of lines 25-1, 25-2 joining the negative line 41.

In operation, electrical energy (current) is supplied through line 40 to electrical line 25-1 within case 21. The heat of the current heats each pellet 24 through which it progresses. Each pellet 24 melts, fusing with one another while impregnating its substance into material 23 of case 21.

Upon a controlled duration of a current charge, the mass of the joined pellets 24 solidifies or sets to form a rigid or firm wall or article which includes the material 23 to which the solidified pellets adhere. These physical steps melt the plastic pellets so that the flexible state of pellets, lines, and fabric is changed to a cast or rigid formation without any chemical change actually occurring in the transition from such flexible state to the cast formation.

These physical operational steps melt the plastic pellets so that the flexible state of pellets, lines, and fabric is changed to a cast formation, rigid or firm, including should it be desired preparation of a pre-designed form of cast prior to distributing heat to the pellets, without a chemical change occurring in the transition from such flexible state to the cast formation.

An example of utilizing a number of cells to form a number of sheltering units that construct into a temporary housing structure by firm or rigid walls, or other article in the utilization of cell 20, is illustrated by a 12-inch by 12-inch cell 20 to which a charging time of between 12 and 24 minutes is applied to electrical line 25-1 by a Yamaha generator, Model EDL6500S [single phase, 60Hz, 6500 watts, rated AC output of 6000 watts, rated current of 50 amps at 120 volts, 25 amps at 240 volts, the Model being belt-driven]. The curing time for the solidification of the solid mass of pellets and their adherence to material 23 is 90 to 120 minutes.

Another example of application of cell 20 upon initiating its transformation from a flexible state into a cast state by reason of the physical changes taking place upon the application of energy to cell 20 is applying cell 20 to an injured limb, such as a broken arm or leg, Pellets 24 are cut from plastic sticks of suitable size, the sticks being like that of the product of Arrow Fastener Co., Inc, 271 Mayhill Street, Saddle Brook, N.J. 07663, sold as Model SS6, which is a glue stick under the brand name ARROW [TM], conforming to the Health Requirements of ASTM D4236. The material 23 of case 21 is of suitable fabric, such as those used in fabricating ordinary clothing, tenting cloth, and the like, and which can include fire-resistant characteristics. The electrical wires 25-1, 25-2 are of a 16-gauge characteristic.

Various changes, modifications, and variations can be undertaken without departing from the spirit and scope of the invention. The carrying out of the invention is not limited to a square-shaped case 21 with equal lengths of wiring segments 29, 33 disposed in a planar fashion as illustrated in this disclosure. The lengths of the rows of pellets 24 can vary one way or the other in a cell 20, as well as the lengths of the segments 29, 33 varying one way or the other, in the design of a particular desired geometrical configuration for a cell 20. The electrical lines 25-1, 25-2, need not necessarily ingress or egress at the same location of case 21 as illustrated in FIG. 1A. The inventive concept embraces utilization of but one electrical line 25 which passes through pellets 24 without a separate electrical line 25-2 included in an embodiment. Electrical line 25 is not limited to its illustrations in the drawing FIGURES, but other electrical wiring networks suitable for supplying heat to pellets 24 can be utilized. The arrangements of the patterns of the electrical line 25 are not limited to a right-angled relationship as illustrated in the FIGURES, as panels containing one or more cells 20 which are utilized in the construction of a housing may be of varying planar dimension, depending on the design of the housing, and which would require a suitable geometrical configuration for one or more cells 20 in a particularly designed panel.

INDUSTRIAL APPLICABILITY

The invention has application in the construction and housing industries, although not limited necessarily thereto.

I claim:

1. A construction cell flexible in nature prior to application of energy thereto for transforming the construction cell into a firm geometrical configuration adaptable for utilization in the construction of a housing comprising sealed fabricated means forming a pocket within it, a plurality of pellet members spacedly disposed within said pocket and including a hole in substantially each of said pellet members, means extending through the hole in substantially each of said pellet members for distributing heat energy to said pellet members, whereby upon application of energy through said distributing means said pellet members fuse with one another in the curing thereof and thereby adhere to said sealed fabricated means to transform said cell into a construction manufacture having a firm geometrical configuration.

2. The cell of claim 1 wherein
   said distributing means comprises electrical means.

3. The cell of claim 2 wherein
   said electrical means comprises first wiring segments.

4. The cell of claim 3 wherein said wiring segments are threaded through substantially each of the holes in said pellet members.

5. The cell of claim 4 wherein said wiring segments are lengths of a continuous electrical wire disposed and displaced in said sealed fabricated means.

6. The cell of claim 5 including
   second wiring segments interwoven with said first wiring segments.

7. The cell of claim 4 including
   second wiring segments interwoven with said first wiring segments.

8. The cell of claim 7 wherein
   said wiring segments are lengths of a continuous electrical wire disposed and displaced in said sealed fabricated means.

9. A flexible construction cell adaptable for utilization in the manufacture of a temporary housing structure comprising pocket means disposed within said construction cell, pellet means contained in said pocket means, said pellet means including a hole in substantially each of said pellet means, means extending through the hole in substantially each of said pellet means for distributing heat contained within the extant of said pocket means, said pocket means formed by a fabric case enclosing said distributing means and pellet means, said pellet means comprising a plurality of spaced pellets contained within said fabric case, whereby said pellets upon the distribution of heat through said distributing means melt and fuse with one another and adhere to said fabric case to transform said construction cell into a firm manufacture.

10. The cell of claim 9 wherein
    said distributing means comprises electrical means.

11. The cell of claim 10 wherein
    said electrical means comprises an electrical line progressing through the hole in substantially each of said pellets.

12. The cell of claim 9 wherein
    said electrical means comprises
    a first electrical line in said pocket means and formed by first spaced segments looped to each other across the extant of said pocket means and progressing through the hole in substantially each of said pellets, and
    a second electrical line in said pocket means and formed by second spaced segments looped to each other and interwoven with said first electrical line throughout the extant of said pocket means.

* * * * *